US012593351B2

(12) United States Patent
Dayi et al.

(10) Patent No.: US 12,593,351 B2
(45) Date of Patent: Mar. 31, 2026

(54) USER EQUIPMENT AND METHOD FOR PRACH PERFORMANCE REPORTING TO BASE STATION

(71) Applicant: Ulak Haberlesme A.S., Ankara (TR)

(72) Inventors: Abdurrahman Burak Dayi, Ankara (TR); Desdina Kof, Ankara (TR); Seyhan Civanlar, Istanbul (TR)

(73) Assignee: Ulak Haberlesme A.S., Ankara (TR)

( * ) Notice: Subject to any disclaimer, the term of this patent is extended or adjusted under 35 U.S.C. 154(b) by 442 days.

(21) Appl. No.: 18/138,747

(22) Filed: Apr. 25, 2023

(65) Prior Publication Data

US 2023/0354434 A1     Nov. 2, 2023

Related U.S. Application Data

(60) Provisional application No. 63/335,587, filed on Apr. 27, 2022.

(51) Int. Cl.
| | |
|---|---|
| *H04W 4/00* | (2018.01) |
| *H04W 24/02* | (2009.01) |
| *H04W 74/00* | (2009.01) |
| *H04W 74/0838* | (2024.01) |
| *H04W 74/0833* | (2024.01) |

(52) U.S. Cl.
CPC ......... *H04W 74/002* (2013.01); *H04W 24/02* (2013.01); *H04W 74/0838* (2024.01); *H04W 74/0833* (2013.01)

(58) Field of Classification Search
CPC ............... H04W 24/02; H04W 74/002; H04W 74/0838; H04W 74/0833; G06N 20/00
See application file for complete search history.

(56) References Cited

U.S. PATENT DOCUMENTS

| | | | |
|---|---|---|---|
| 9,491,780 B2 | 11/2016 | Pang et al. | |
| 2024/0039799 A1* | 2/2024 | Parichehrehteroujeni | .................. |
| | | | H04L 1/0009 |
| 2024/0334524 A1* | 10/2024 | Chen | ..................... H04W 76/10 |

(Continued)

FOREIGN PATENT DOCUMENTS

| | | | | |
|---|---|---|---|---|
| EP | 4422332 A1* | 8/2024 | ............. | G06N 20/00 |
| WO | WO-2020234507 A1* | 11/2020 | .............. | G06N 3/08 |
| WO | 2021215995 A1 | 10/2021 | | |

(Continued)

OTHER PUBLICATIONS

Davide Magrin, et al., Enabling LTE RACH Collision Multiplicity Detection via Machine Learning.

(Continued)

*Primary Examiner* — Thai Dinh Hoang
(74) *Attorney, Agent, or Firm* — Bayramoglu Law Offices LLC

(57) ABSTRACT

A user equipment (UE) sends a simple message on a control channel to the base station (BS) that is using Machine Learning (ML) engine for random access (RA) procedures, the message being an indicator of a poor preamble detection performance of the BS upon UE observing repeated failure of random access attempts on the physical random access channel (PRACH). In response, the BS collects controlled preamble detection training data by selecting a plurality of trainer UEs and sending each UE a training random access configuration to use during a training cycle.

17 Claims, 16 Drawing Sheets

(56) References Cited

U.S. PATENT DOCUMENTS

2025/0225435 A1* 7/2025 Larsson ................. G06N 20/00

FOREIGN PATENT DOCUMENTS

| WO | WO-2022037795 | A1 | * | 2/2022 | ............. G06N 3/088 |
|----|----|----|----|----|----|
| WO | WO-2023059639 | A1 | * | 4/2023 | ............. H04W 28/18 |
| WO | WO-2023081187 | A1 | * | 5/2023 | ........... H04B 7/0626 |
| WO | WO-2023187676 | A1 | * | 10/2023 | ............. G06N 20/00 |

OTHER PUBLICATIONS

Haoran Sun, et al., Deep Learning Based Preamble Detection and TOA Estimation, IEEE, 2019.
3GPP TS 38.211, 3rd Generation Partnership Project; Technical Specification Group Radio Access Network; NR; Physical channels and modulation (Release 15), 2017, pp. 1-10.

* cited by examiner

Input:
PRACH Antenna
Signals

Output:
Preamble Status/Info
To Upper Layers

300

ML Engine

USER EQUIPMENT AND METHOD FOR PRACH PERFORMANCE REPORTING TO BASE STATION

CROSS REFERENCE TO THE RELATED APPLICATIONS

This application claims priority to provisional application 63/335,587, filed on Apr. 27, 2022, the entire content of which is incorporated herein by reference.

TECHNICAL FIELD

The present invention relates generally to wireless networks and more particularly to methods and components for a transmitter and receiver of a User Equipment in cellular networks that are LTE and beyond for random access preamble processing.

BACKGROUND

Any discussion of the prior art throughout the specification should in no way be considered as an admission that such prior art is widely known or forms part of common general knowledge in the field.

Key Words

5G, Base Station, New Radio, NR, Random Access, RA, Preamble, Physical Random Access Channel, PRACH, Contention-Based Random Access, CBRA, Cyclic Prefix, Zadoff-Chu, Machine Learning, Artificial Neural Network, Recursive Neural Network.

Acronyms and Definitions

AI Artificial Intelligence
ANN Artificial Neural Network
BS Base Station
CBRA Contention-Based Random Access
CFRA Contention-Free Random Access
CP Cyclical Prefix
DB Database
DFT Discreet Fourier Transform
DL Downlink
IFFT Inverse Fast Fourier Transform
IoT Internet of Things
FFT Fast Fourier Transform
ML Machine Learning
PDP Power Delay Profile
PDCCH Physical Downlink Control Channel
PDSCH Physical Downlink Shared Channel
PRACH Physical Random Access Channel
PUCCH Physical Uplink Control Channel
PUSCH Physical Uplink Shared Channel
RA Random Access
RNN Recursive Neural Network
RRC Radio Resource Control
RTT Round Trip Delay
SI System Information
SNR Signal to Noise Ratio
UE User Equipment
UL Uplink
ZC Zadoff-Chu

BRIEF DESCRIPTION

Random access (RA) procedure specified for LTE and 5G cellular networks is generally used by a User Equipment (UE) to request an uplink (UL) channel access (time-frequency resource) when it has data to transmit to the base station (BS), and/or to achieve time synchronization with the BS. A random access (RA) request is generated in the form of a 'preamble' on the dedicated Uplink (UL) Physical Random Access Channel (PRACH). The BS informs all UEs via the broadcast channel the System Information (SI) about which time-frequency resource to use for PRACH.

PRACH is multiplexed with other uplink channels such as Physical Uplink Shared and Physical Uplink Control Channels (PUSCH and PUCCH, respectively) in time and frequency. The base station can re-allocate PRACH time-frequency resources from time-to-time within the PUSCH region. The random access process allows the uplink resources to be allocated to the requesting UE as well as determining the round trip time (RTT) between that UE and the BS to estimate the expected delay of received signals on uplink.

There are two different modes for random access, namely Contention-Based Random Access (CBRA) and Contention-Free Random Access (CFRA). In CBRA, the UE randomly selects a preamble from a pool of preambles shared with all other UEs in that cell. The RA transmission (also referred to as the "preamble") can collide with random access transmissions from some other UEs attempting at the same time to access the same UL network resource by choosing the same preamble. For some special random-access scenarios (e.g., handovers), the BS has the option of preventing contention by assigning a unique preamble to a UE, resulting in contention-free random access (CFRA) generally used for rapid resource allocation for time-critical uses. CFRA requires the network to reserve preambles and corresponding PRACH UL time and frequency resources, which may be inefficient. For CFRA, the UE is configured with the UL PRACH resource and preamble to use to perform random access (RA) procedure. Therefore, the BS listens to a specific PRACH time-frequency radio channel for each CFRA preamble assigned. For CBRA, however the UE must select a preamble from a group of preambles and identify the time and frequency resources on the UL to transmit that preamble based on the results of signal quality measurements.

Only 64 preambles are available for LTE and 5G in each base station (BS), which must be partitioned between CBRA and CFRA usage. If at any time more than 64 UEs in a cell simultaneously try to access PRACH, collision becomes inevitable.

A UE attempts RA procedure for reasons other than requesting UL resources to send data to BS such as (i) initial access from Radio Resource Control (RRC) IDLE state, (ii) for RRC connection re-establishment procedure; and (iii) during handover. Therefore, RA is a frequently used and highly important procedure of a cellular network, and effective preamble detection for that reason is paramount.

In prior art, the base station uses a threshold based approach to detect a preamble by comparing the peak value of the circular cross-correlation between the preamble signal and a reference signal against a preconfigured threshold value. A preamble is detected when the resultant peak value is above that threshold. The goal is to set this threshold low enough to detect the preamble but high enough to avoid false-alarm probability due to noise or interference. There is a different threshold value used per preamble. Therefore, when the cell profile changes (i.e., major SNR change or UE population and location changes), the BS must re-estimate the new threshold value for each preamble.

In theory, when two UEs originate the same preamble at the same time and send to the BS, these preambles may arrive at the BS with different delays when UEs are at different distances away from the BS. In this scenario, the BS can detect both preambles using the threshold method, notice the collision and may decide to avoid sending a response to force the UEs to reinitiate the process with different preambles. However, in real-life, i.e., when the cell size is small, or the UEs are geographically clustered together as in urban areas, or the preamble timing is configured according to cell size, the collision is unavoidable. When there is collision, the base station sends a random access response (RAR) on the broadcast downlink channel in response to a detected preamble, both UEs sending the same preamble will receive that RAR, deduce that they are given access to the same UL resource, and go to the next step by sending a message known as 'message 3' on that UL resource. The contention resolution then occurs at next step when the BS sends a message addressed directly to only one of the two UE's ID. This whole process wastes significant uplink channel bandwidth and must be avoided as much as possible.

As the number of UEs reach large numbers, the collision becomes more frequent and finally leads to PRACH congestion. The UEs end up transmitting preambles repeatedly until the maximum allowed number of preamble transmissions is reached. Even when the UEs finally manage to successfully complete the RA procedure, the access delay may still be unacceptable. The congestion will block most of the RA attempts from UEs even if the uplink has lots of unused radio resource and leads to an under-utilized network.

Some useful CBRA measurements can be collected in real-time and even stored by the higher layers such as successfully detected preamble signals and the corresponding identified preambles. Furthermore, cell profile information is regularly collected by the BS over time to observe cell profile changes. The base station can adjust the allocation of preambles between CBRA and CFRA, adjust the preamble detection threshold, and modify key preamble parameters to improve process performance.

Technical Problem

Optimization of the random-access process is imperative to improve the system performance of the cellular network. A poorly performing random access may result in frequent CBRA collisions, low preamble-detection probability, and reduced bandwidth for actual data transmission because of flood of RA messages both on UL and broadcast DL. The amount of UL resources reserved for PRACH is usually limited. Therefore, BS must improve successful preamble detection considering factors such as the random-access traffic load, uplink transmission quality and interference, traffic patterns, channel noise level, BS antenna configurations, and UE population size and/or density in cell's coverage. This task becomes even more complicated as these factors change dynamically.

The threshold based detection is simple but known to suffer from being ineffective when the number of UEs in a cell increases. Furthermore, the adjustment of the threshold value according to changing cell profiles must be repeated for each preamble which requires a significant amount of computation.

The base stations are designed to handle over hundreds of RA attempts on PRACH per second. However, forecasts indicate that RA traffic in 5G cellular networks could reach much larger number of attempts (many hundreds per second) soon, mainly due to the expected increase of the Machine-to-Machine Internet of Thing (IoT) traffic that sends frequent and periodic UL data. With so much UL channel usage requests, PRACH overload will naturally be generated and will become a serious issue.

The PRACH channel usage in 5G (and beyond) must be better optimized with better preamble detection techniques under additive channel noise and cross-channel traffic. Based on discussions, an object of the present invention devised to improve the performance of the PRACH by providing a superior preamble detection.

Technical Solution

Embodiments of the present disclosure provide specific improvements to the user equipment in a wireless communication network such as facilitating solutions to overcome the problems summarized above and described in more detail below. More specifically, exemplary embodiments of the present disclosure aim at addressing these and other issues associated with random access performance in cellular networks specifically, for LTE and beyond, and other similar radio networks by a new technique whereby an artificial intelligence (AI) or machine learning (ML) based algorithm that has a set of tunable parameters enables optimized and/or improved random access preamble detection for CBRA and CFRA, reduced undetected collisions and false alarm instances. What is grossly lacking in prior art is how and when the ML engine training will be triggered when the PRACH performance deteriorates since the undetected or falsely detected preamble information is only visible to the affected UEs (and not to the BS). In one embodiment, the affected UE that has repeated random access failures (which causes significant random access delays) informs the BS through a simple message that the PRACH performance is not sufficient. A group of UEs is then selected as so-called trainer-UEs to which BS sends training CFRA configuration and the UL PRACH resource to send the preamble to gather collision-free controlled preamble data simply for generating a reliable training dataset. The ML algorithm is trained using random access dataset gathered by the BS using both controlled and normal preamble RA data.

There are few references in prior art on applying a Machine Learning engine within a PRACH receiver for optimizing some aspects of the PRACH process. For example, in patent application WO2020234507A1 dated Nov. 26, 2020, each UE in the cell logs its random-access procedure data and submits the logs in the form of a report to the BS, upon request. Collected UE reports are then used by an ML engine to adjust PRACH's time-frequency resources to reduce PRACH radio network costs.

In patent application, WO2021215995A1 dated Oct. 28, 2021 an ML engine is trained by a dataset of measurements of received UL and DL signals, and used to determine the output parameters for UE's PRACH configuration to attain a better PRACH performance. These configuration parameters are UE's power levels for an initial transmission of the preamble, measurement thresholds corresponding to the power levels, power ramping steps for retransmissions of the preamble, and maximum number of preamble retransmissions before declaring random access failure. There are a few recent academic references (see Magrin et. al. and Sun et al.) providing encouraging results wherein a ML engine is used solely for improved preamble detection.

However, none of these references provide a system and method for an improved preamble detection through an ML engine by using an intelligent ML engine trainer wherein the training trigger comes directly from the UEs that experience poor PRACH performance. The method according to this invention requires only a simple message from affected UE experiencing poor PRACH performance. This eliminates the need for the UE to send large RA log files as specified in WO2020234507A1 and U.S. Pat. No. 9,491,780 B2, or the BS to guess the PRACH performance based on limited data. Doing so, the embodiments of this invention address significant number of emerging UEs that are simple IoT devices such as sensors and cameras that have very limited memory and processing power to store and send detailed RA log files. Once the BS determines to retrain the ML engine based on the received indication from a plurality of UEs, it is assigns CFRA to a group of trainer-UEs to collect meaningful, reliable, and controlled training dataset. While any UE can send said indication whether is a simple IoT, another type of device performing machine-to-machine communications (MtMC), or a mobile phone, trainer-UEs may be selected from those UEs that have more processing power and memory. Additionally, the BS uses as part of the training dataset uncontrolled (normal) successful preamble detection data that is processed in real-time or locally stored.

The methods described here are used by the Machine Learning (ML) engine, whose training is triggered and repeated under different recorded channel performance, traffic conditions and different number of UEs that enables quick and highly reliable preamble detection during random access. By doing so, the PRACH and uplink capacity are used more efficiently because unnecessary RA transmissions due to lack of collision detection are greatly reduced. This further saves the UE battery life as unnecessary preamble retransmissions at ramped power conditions are deemed unnecessary.

The ML engine is a live system and most logically placed on the receiver subsystem of a base station or a Distributed Unit (DU) component where radio signals from antennas are directly received while the ML training engine is most logically placed on a Central Unit (CU) component of a base station, or on yet another component of the base station that has sufficient memory and processor (a computer) where information on live and past RA traffic is processed and stored. The ML engine takes the role of detecting the existence of a preamble (according to step 1 of CBRA procedure) on PRACH, and hence operates on live UE traffic transmitted to the BS in real-time.

Each RA preamble sample sequence or a processed version is the input to the ML engine wherein the output of the ML engine is whether the sequence is a preamble or not (binary), and if yes, the preamble index and RTT. The ML engine operates on all preambles using a single set of ML engine parameters.

The ML training engine can be implemented either on the same processor with the ML engine or on a separate processor. The ML training engine takes the role of reoptimizing the ML engine parameters from time to time using RA measurements collected by the base station, and hence can perform training in non-real-time.

There are many possible ML engine implementations in prior art. One of them is Artificial Neural Network (ANN), wherein the ML engine parameters are simply a list of parameters used by the linear or non-linear function of neurons/nodes at neural network layers. Each online ML training dataset entry includes input values and corresponding output values (labels) pertaining preamble detection, wherein these values together are used to determine the ML engine parameters.

The online ML engine training and test datasets are collected by the base station and includes one or more of the following input values: time-domain radio signals directly received from the antenna, power delay profiles (PDP) of received preambles, or any other form of processed signals obtained between the physical layer subblocks of the BS receiver. The input dataset obtained during a period can be categorized according to other relevant information such as estimated Signal to Noise Ratio (SNR) of the PRACH, and the cell profile, i.e., the number and location information for UEs operating in the cell at the time of dataset collection.

The online ML training dataset when collected using the 'controlled' method according to invention, the base station may require a plurality of trainer-UEs to conduct a controlled CFRA process such that the BS knows exactly the ID of the preamble sent by the UE on a specific time-frequency PRACH resource. The dataset contains at least the received preamble signal (or a processed version of it) and the corresponding preamble ID.

The base station sets aside (reserves) a single CFRA preamble that is not assigned to any UE. The BS listens to the corresponding reserved time-frequency PRACH resource to receive channel noise only.

The online ML training dataset may also be collected by a network simulator that models PRACH transmission over realistic channel conditions and number of UEs. In yet another embodiment, the online ML training dataset may be collected using a field trial wherein a small set of UE behavior is controlled. These methods are used for the initial power up of the ML engine before any live RA traffic is processed.

A training triggering subsystem activates dataset collection from live random access traffic on PRACH until a training cycle is deemed completed. In one embodiment, the ML engine training triggering subsystem initiates a training cycle under exemplary cases of (i) significant change in cell profile, (ii) missed collisions and false alarms over a time-period exceeding a threshold detected by failed CFRA attempts; and (iii) UEs explicitly reporting unsatisfactory RA performance to base station by sending a message according to an aspect of this invention.

Advantageous Effects

According to the embodiment of the present invention, the new radio base stations have resident ML engines which can be programmed for preamble detection without adding new hardware to the system. Furthermore, the dataset required to train the ML engine can be collected by the upper layer functions of the base station. In terms of complexity, the ML engine requires more computation (number of multiplications and additions) per preamble detection than the prior art threshold method, but the ML-engine training can be performed offline. However, the complexity burden of the embodiments is on the base station whose hardware and software capabilities are constantly improving and typically has very little computational and energy restrictions. Furthermore, the ML engine uses one set of parameters for all preambles as opposed to a different threshold value per preamble according to prior art that requires more computation for each threshold determination/update cycle.

The methods of this invention puts little minimal burden on the UE to collect and report controlled random access performance, particularly catering for simple UEs such as IoT and MtMC devices with extremely limited memory and processing.

It will be appreciated by persons skilled in art that the effects that could be achieved with present invention are not limited to what has been particularly described here. Other advantages can be clearly understood from the following detailed description.

SUMMARY

The first embodiment according to an aspect of this invention is a method of the user equipment that is deployed within the radio access network (RAN) cell of a base station that uses Machine Learning engine for the random access procedure, said user equipment observing failure of a plurality of random access requests over Physical Random Access Channel (PRACH), the method having the steps of: (a) Receiving from the base station an indicator during random access configuration of said user equipment that the base station is using Machine Learning for random access procedures, and (b) Sending by a User Equipment trigger training message to the base station that the random access is poorly performing to force retraining of said Machine Learning engine if the user equipment received said indicator during configuration.

The second embodiment according to an aspect of this invention is a method of a user equipment that is deployed within the radio access network (RAN) cell of a base station that uses Machine Learning engine for the random access procedure, the method having the steps of: (a) Receiving from the base station the training activation control message to initiate training data collection from said user equipment said control message including a contention-free random access configuration for training purposes only, (b) Sending by the user equipment the contention-free random access (CFRA) preamble over configured PRACH to base station, and (c) Resuming normal random access procedures by the user equipment after step b.

The third embodiment according to an aspect of this invention is a method of a user equipment that is deployed within the radio access network (RAN) cell of a base station that uses Machine Learning engine for the random access procedure, the method having the steps of: (a) Receiving from the base station the training activation control message to initiate training data collection from said user equipment said control message including a contention-free random access configuration for training only with an indication to repeat sending the contention-free random access preamble until the training complete control message is received by the user equipment from the base station, (b) Sending by the user equipment the CFRA preamble over configured PRACH to base station a plurality of times until receiving said training completed control message from the base station, and (c) Resuming normal random access procedures by the user equipment after step b.

The fourth embodiment according to an aspect of this invention method of a user equipment that is deployed within the radio access network (RAN) cell of a base station that uses Machine Learning engine for the random access procedure, the method having the steps of: (a) Receiving from the base station the training activation control message to initiate training data collection from said user equipment said control message including a CFRA configuration for training only with an indication of the number of repeats the user equipment must send the CFRA preamble, (b) Sending repeated by the user equipment the contention-free random access preamble over configured PRACH to base station said number of repeats, and (c) Resuming normal random access procedures by the user equipment after step b.

Said third method has the step of reporting to the base station the number of times the CFRA procedure is attempted and the number of times the CFRA procedure has failed by not receiving the random access response to the sent preamble.

According to an aspect of this invention a user equipment is a user equipment that has reported poor random access performance using the trigger training message. Optionally, the user equipment is a user equipment is not necessarily among the user equipment that reported poor random access performance using the trigger training message according to first embodiment.

Said CFRA configuration sent to each user equipment are different. Optionally, the same CFRA configuration is sent to a group of user equipment.

The fifth embodiment according to this invention is a user equipment transmitter and receiver configured to participate in training of the Machine Learning engine based random access procedure of the base station having the components of: (a) A random access (RA) performance monitor that keeps track of failed random access attempts and informs the training module if the performance is declared as poor. (b) A training trigger module that generates the trigger training control message and sends it lower layers to send to the base station. (c) A training module that initiates and coordinates sending of CFRA preambles for training purpose, the module including two counter storages that counts the CFRA repeats, one for successful and other for failed CFRA attempts.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DETAILED DESCRIPTION OF THE EMBODIMENTS

Figure 1:
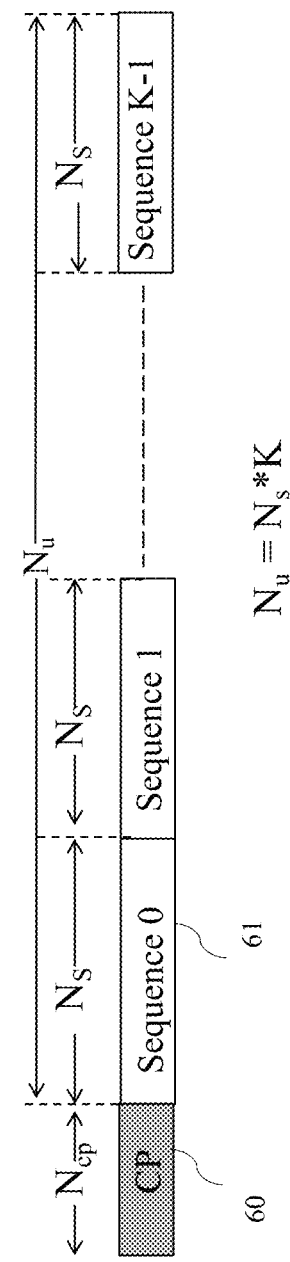
FIG. 1 Illustrates the preamble format according to prior art.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

The base station has many more components than those described in this disclosure. Those components are omitted so that the invention is easy to understand. Furthermore, other parts of a new generation wireless networks such as the data plane and control plane of the core network are also omitted as those parts are not relevant to invention.

Functionalities according to several embodiments of this invention are grouped as receiver functions of a base stations for simplicity, wherein in another embodiment of this invention some functionalities may belong to subsystems of the base station other than the receiver.

The preamble transmitted over PRACH is known in prior art as the Zadoff-Chu (ZC) sequence which has useful properties as a preamble. The ZC sequences are generated using a 'root sequence index', u, and 'sequence length', $L_{RA}$, as parameters using the following equation:

$$x_u(n) = e^{-j\frac{\pi u n(n+1)}{L_{RA}}}, n = 0, 1, \ldots, L_{RA} - 1$$

The 5G standards allow $L_{RA}$ values as prime numbers 139, 571, 839, and 1151. Inspecting the above equation, all ZC sequences have the same constant amplitude and is periodic with a period of $L_{RA}$, meaning for any integer k $$x_u(n) = x_u(n+k \cdot L_{RA})$$

The circular auto-correlation of the ZC sequence is zero. The circular auto-correlation of the ZC sequence with a k-delayed version of itself is however non-zero and constant only at the kth sample:

$$R_{x_u(n-k)x_u(n)}(m) = \frac{1}{L_{RA}} \sum_{n=0}^{L_{RA}-1} x_u(n - k + m)x_u^*(n) = \begin{cases} 1 & m = k \\ 0 & \text{otherwise} \end{cases}$$

This is a useful property to estimate round trip time (RTT) delay between the BS and the UE to calculate an accurate timing. Finally, the circular cross-correlation of any two different ZC sequences (generated using different root sequence indices but the same sequence length $L_{RA}$) is constant and very low (equal to $1/\sqrt{L_{RA}}$) and shrinking as the sequence length $L_{RA}$ gets longer.

The ZC sequence corresponding to a preamble is generated with a root sequence index, sequence length, and by simply cyclical shifting on the root sequence by a defined number of samples. The BS configures the available preambles for a UE as follows: The BS assigns a root sequence index (defined in TS 38.211) and a configuration index to all UEs from which they can infer the sequence length $L_{RA}$. The BS also indicates the number of samples by which the root sequence would be shifted to reach any of the 64 preambles.

Unfortunately, only a subset of cyclic shifts is possible to generate different preambles, where the number of possible cyclic shifts that retain preamble orthogonality depends on the maximum uncertainty in receive timing, which, in turn, depends on the cell size. If 64 preambles cannot be generated using a single root sequence index, that is, if sufficiently many cyclic shifts are not feasible, additional preambles are generated from cyclic shifts of the next root sequence index and so on until the required up to 64 preambles are generated.

Preamble formats define the sequence length ($L_{RA}$), subcarrier spacing of the PRACH signal ($\Delta f^{RA}$), number of repetitions of the sequence and the cyclic prefix (CP) lengths. The BS may decide to assign UEs different preamble formats for different transmission conditions by simply changing the root sequence index and sequence length ($L_{RA}$).

The preamble consists of a Cyclical Prefix (CP) of length $$N_{CP}^{RA},$$

followed by K sequence repetitions each of length $N_s$ samples of ZC, with a total sequence length of $N_u$ samples and with K≥1 at subcarrier spacing $\Delta f^{RA}$ as illustrated in FIG. 1 followed by a Guard Time (GT).

CP is well-known in prior art as the repetition of last samples of preamble sequence in time-domain and its length changes depending on the preamble format. The function of CP is to prevent data loss resulting from multipath propagation. The entire sequence including the CP is considered as the preamble. The function of GT is to prevent interference that occurs between the preamble and successive UL transmission.

The resource allocation to PRACH in time-frequency domain is defined by the BS and communicated to each UE with a higher layer parameter. The starting frequency domain location for PRACH transmission is defined by the BS. The number of resource blocks occupied by PRACH samples can be calculated as a function of preamble subcarrier spacing $\Delta f^{RA}$ and common uplink channel subcarrier spacing on which the PRACH transmission occurs.

Figure 2A:
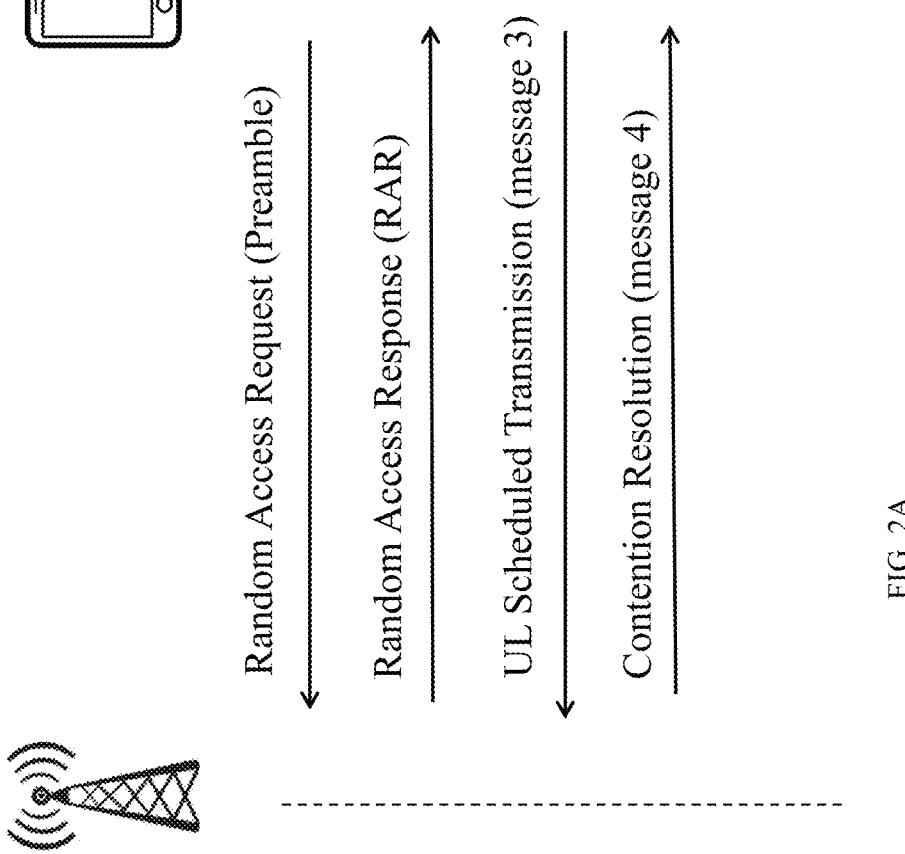
FIGS. 2A, 2B Show the CBRA and CFRA procedure steps, respectively, according to prior art.

FIG. 2A illustrates the four-step process in an exemplary CBRA procedure that is summarized as follows:

Step 1 (Random Access Preamble): The UE randomly selects one random-access preamble (or sequence) from a known set of preambles indicated by the BS via broadcast System Information (SI). The purpose of random preamble selection is to avoid collision by separating the preambles in a code domain. Even so, a random preamble selection may result in more than one UE to simultaneously choose and transmit the same preamble (i.e., requesting the same UL resources from the BS), leading to a need for a subsequent repeated contention resolution process. When the number of UEs transmitting the preamble at the same time is larger than 64, then collision will happen absolute certainty.

The available number of CBRA preambles is 64 minus the number of preambles allocated to collision-free random access (CFRA). The available CBRA preambles are further divided into two groups. The grouping allows the UE to signal whether it needs radio resources for a small or large message using one bit. That is, a randomly selected preamble from one group can indicate that the UE has a small amount of data to send, while a preamble selected from another group indicates that resources for a larger amount of data are needed.

The BS continuously monitors PRACH to detect any random access attempts by UEs in its cell. Under normal channel conditions, the BS detects all non-colliding preambles transmitted by UEs and estimates the roundtrip time (RTT) between the BS and each UE from the preamble. The RTT estimation is needed to achieve time synchronization between BS and UE. Sometimes, however, the BS may not correctly receive a UE's random-access preamble transmission due to collision with other preambles or the additive noise or interference on the channel.

Step 2 (Random Access Response (RAR)): The UE receives the RA response in step 2 from the BS that carries the estimated RTT (as timing advance command) as well as the UL grant of resources for the UE to transmit data. The RA response is sent to the UE on a Physical Downlink Shared Access Channel (PDSCH) with other UEs. All UEs that transmitted a RA preamble monitors the shared PDSCH after their preamble transmission to receive their RAR. If the UE does not detect a response within a specified time window, it declares a RA failure and repeats RA transmission using an increased power level. The process continues until the UE receives the RA response, or until a maximum number of attempts is reached, upon which the UE declares failure. Upon a successful response, the UE receives a UL grant that is a location on the UL time/frequency resource grid for transmission.

Step 3 UL Scheduled Transmission: At step 3, the UE is time synchronized with the BS. The UE transmission in this step (referred to also as "message 3") uses the UL PUSCH channel radio resources assigned in step 2. The message 3 is the UE's first scheduled UL transmission. It conveys an actual RRC procedural message with a unique UE ID to be used in contention resolution. In case of a preamble collision at step 1, the colliding UEs will all transmit colliding message 3 (because they all received the RAR that was intended for another UE) that use the same assigned UL time-frequency resources. This may result in interference such that none of the colliding message 3s can be decoded and responded by the BS. The colliding UEs re-start the PRACH procedure by selecting another preamble. However, even if BS can decode at least one UE message 3 successfully, the contention remains unresolved for all other UEs that were using the same preamble at step 1. That is why step 4 below is required.

Step 4: Contention Resolution: At step 4, the MAC downlink message 4 sent by BS in response to message 3 mainly for a quick resolution of contention. The message 4 on the PDSCH is addressed to the unique ID of the UE from which a first successful message 3 is decoded by the BS. The assumption is that this ID allocated to UE by the BS is unique and there is no source of confusion, i.e., all other UEs that sent message 3 and receive message 4 from the BS recognize a different UE ID than that of themselves and understand that a collision happened. In this case, these UEs restart the RA process with another preamble.

Figure 2B:
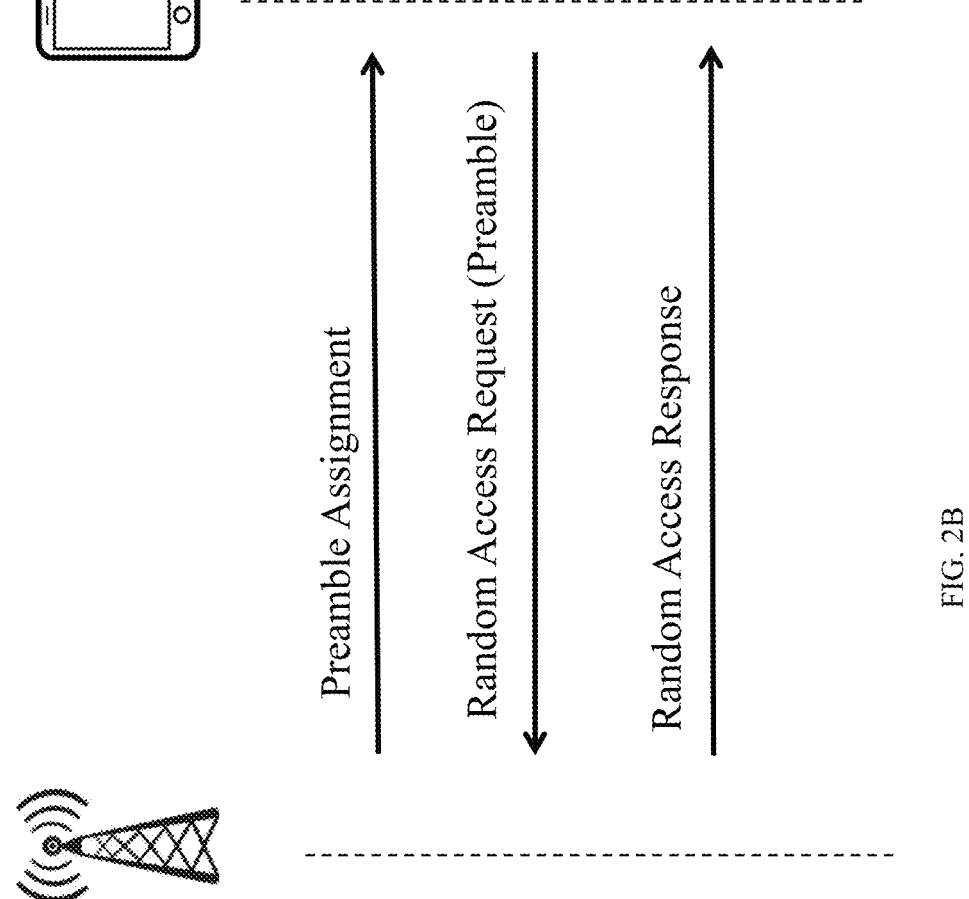

FIG. 2B shows the steps of CFRA process that is used when a network-enforced random access operation is required, such as during a handover or a downlink data arrival with non-synchronized uplink. In step 1, the BS assigns the UE a specific preamble and dictates in which PRACH resource to send it so that there will be no contention involved. The UE sends the RA request message on PRACH in step 2. Then, the BS sends a RAR, which carries the uplink resource grant. Since there is no possibility of contention, there is no need for messages 3 and 4. The RTT between the UE and BS is detected through step 2.

Figure 3A:
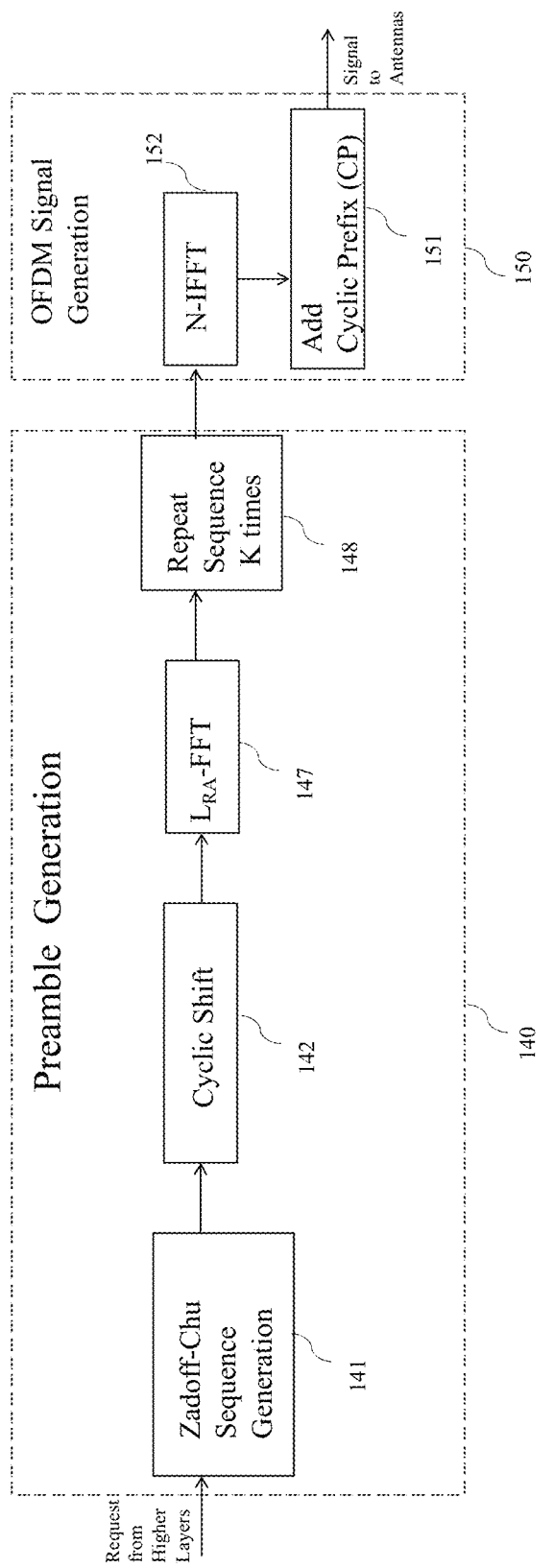
FIGS. 3A, 3B Illustrate simple block diagram of the PRACH transmitter and receiver according to prior art.

FIG. 3A depicts a high-level block diagram of a typical prior art PRACH transmitter located in a UE. In box 140, the transmitter in the UE selects one of 64 preamble configurations defined by the root sequence index and cyclic shift. A ZC Sequence of length $L_{RA}$ is created with the root sequence index in box 141, and then cyclically shifted by an amount of selected shift in box 142. This amount of cyclic shift is indeed randomly chosen from all available shifts specified by the BS which creates a random preamble. Generated time domain sequence is then converted to frequency domain by taking the $L_{RA}$ point Fast Fourier transform (FFT) of the signal using $L_{RA}$-FFT block 147. FFT is a simple matrix multiplication that converts time domain samples to frequency domain samples. The obtained sequence is then repeated K times in frequency domain as required by the preamble configuration (see FIG. 1) in box 148. The OFDM modulation is then applied in 150 to the composite frequency domain signal to return it back to time domain before transmission by first taking the N-IFFT block, where $N > L_{RA}$ is defined in 3GPP specifications. The Cyclic Prefix (CP) is then added in 151, and the final radio signal is sent to the transmit antennas.

Figure 3B:
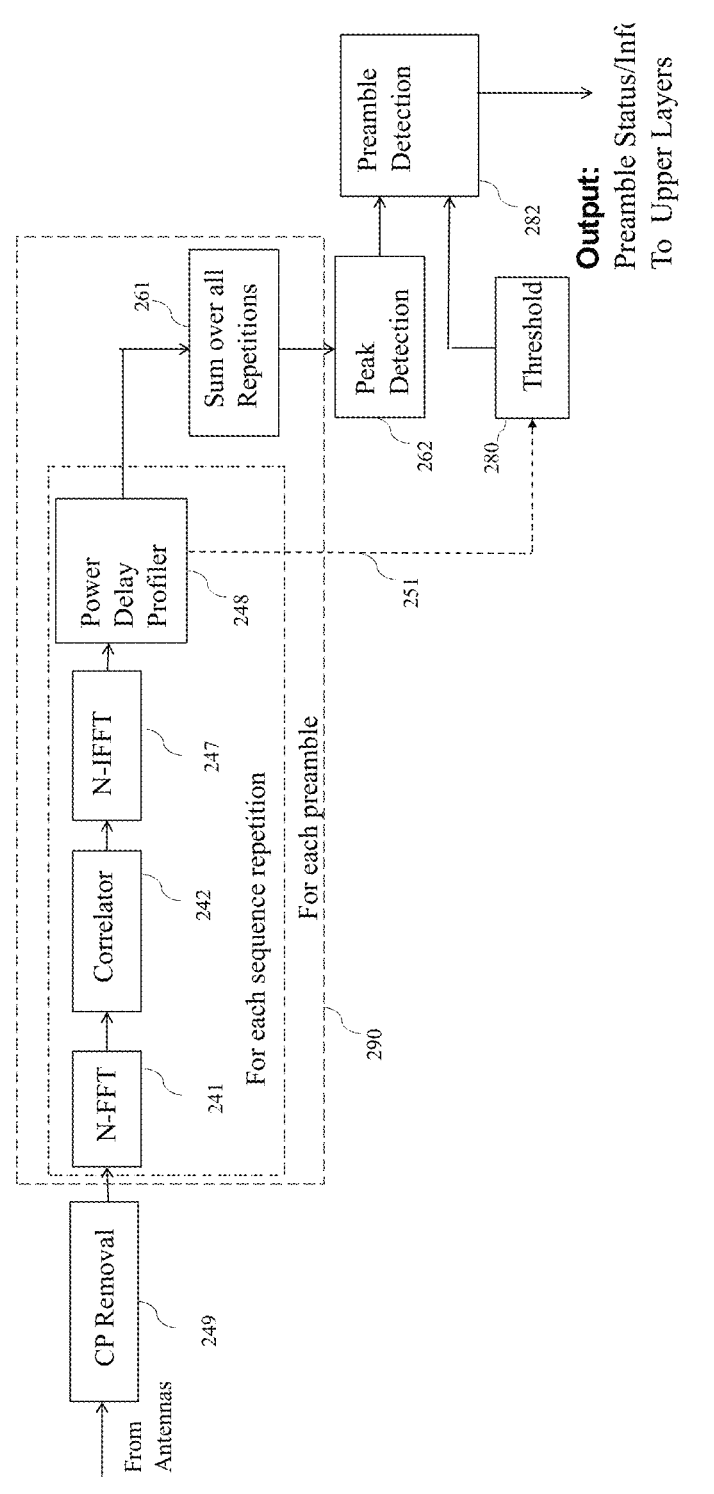

FIG. 3B depicts a high-level block diagram of a prior art PRACH receiver located in the BS. For simplicity, the transmission of single PRACH configuration and reception on a single receive antenna is illustrated. As illustrated in FIG. 3B, the processing at the PRACH receiver begins with CP removal in 249. For all preamble repetition (sequence 0, 1, . . . , K−1 as illustrated in FIG. 1), the OFDM symbols are demodulated through an N point FFT operation converting the time domain preamble signals to frequency domain samples. Now, in frequency domain, Correlator 242 correlates each received preamble sequence (0, 1, 2 . . . , K−1) with locally generated possible preamble candidates (also known as the reference signal). Note that the reference signal is also first converted to frequency domain through the FFT operation followed by conjugation operation (not illustrated in the figure for simplicity). The absolute value of the conjugate multiplication product of the reference and received sequences is then fed into the N-IFFT 247 and element-wise norm squaring which gives the Power Delay Profile (PDP) of the sequence/repetition in process step 248 of the signal in time-domain. The PDP of the preamble is then determined by 261 simply summing up the PDP over all K sequence repetitions. While the peak sample value of the PDP generated in 262 indicates whether a candidate preamble is transmitted or not in comparison to threshold 280 that is preconfigured, all other sample values can also be useful to estimate the channel's noise power level, and later determine an update on the threshold in box 280. The preamble detector 282 simply compares the peak PDP detected in 262 with the preconfigured threshold. It also determines the preamble index and the RTT from the PDP. Reporting this set of information to upper layers concludes preamble detection step of the PRACH receiver operation.

Figure 4A:
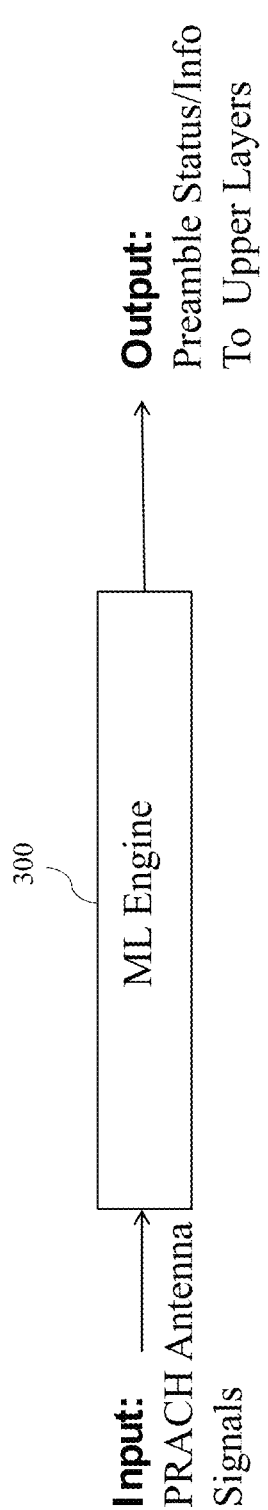
FIGS. 4A, 4B, 4C illustrate high-level block diagrams of possible embodiments of the PRACH receiver with ML according to invention.

One possible embodiment of the ML engine is illustrated in FIG. 4A wherein the entire physical layer processing illustrated in FIG. 3B is carried out within a single ML-based processing block. The ML Engine 300 derives the baseband signal samples from antenna signals when it detects a PRACH signal and sends to higher layers the information on whether there is preamble detection or not. Also, the ML engine derives the preamble index and associated timing advance value. While it is possible to feed the antenna signals directly to ML Engine 300 as a single input vector, the antenna signals can also be combined, transformed, or encoded beforehand to get possibly better results. The output may also be encoded to indicate different aspects of the output. The shortcoming of this embodiment is the possible complexity of ML Engine 300 because it undertakes many operations such as FFT, I-FFT and correlation (all are matrix multiplications) that are otherwise performed by readily-available extremely fast special-purpose hardware.

Figure 4B:
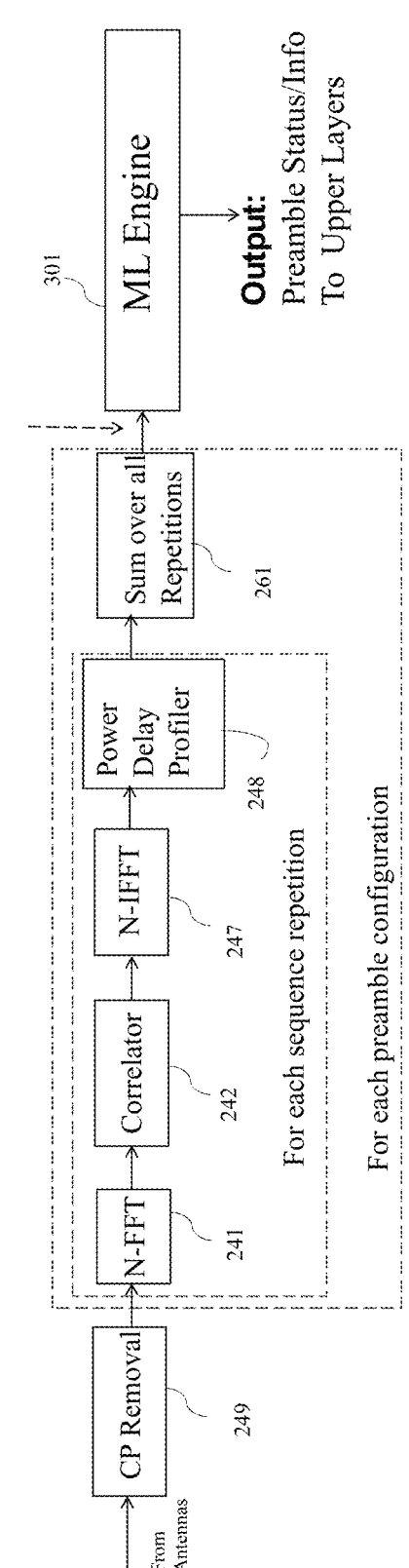

The second possible embodiment of the ML engine is illustrated in FIG. 4B wherein power delay profiles obtained by the correlation of received preamble and reference preambles constitute the input of the ML Engine 301. Note that the input blocks 249, 241, 242, 247, 248 and 261 are the same as the prior art receiver. The input PDP profile of each preamble configuration is fed to ML Engine 301. The ML Engine should be trained earlier with example power delay profiles. The output vector of the ML engine includes at least whether there is a preamble detection (binary value), and if a preamble is detected, the preamble index and associated RTT. The output might also be encoded to indicate other results.

Figure 4C:
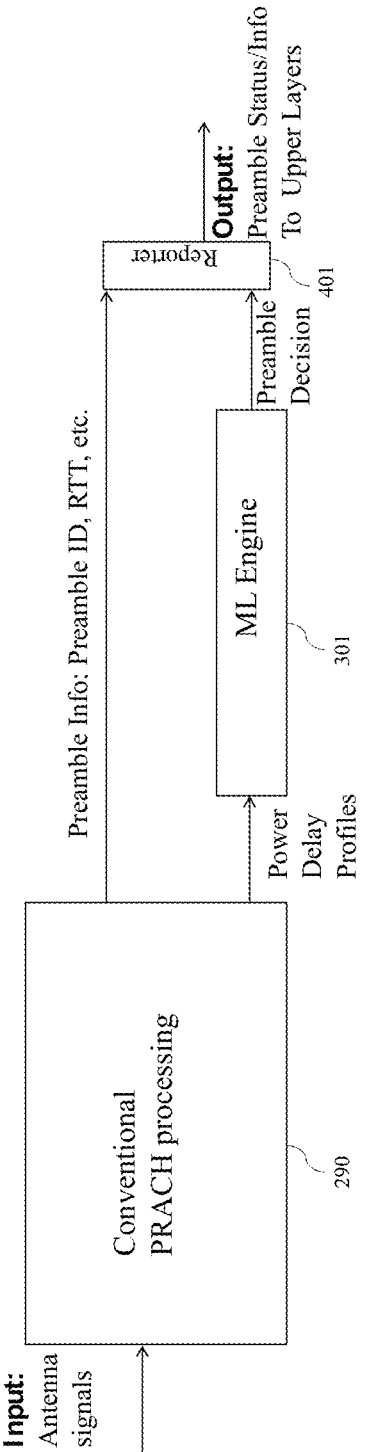

FIG. 4C illustrates yet another possible embodiment of ML Engine 301 that is in combination of the conventional PRACH processing chain which executes all the steps prior to preamble detection as in FIG. 4B but leaves only the preamble detection decision to the ML Engine 301. The Conventional PRACH Processing 290 provides the corresponding preamble index and RTT estimation while ML Engine 301 detects whether there is a preamble or not. Reporter 401 combines the results and reports the result to higher layers such as the MAC layer. This embodiment uses complimentary conventional and ML based approaches.

In yet another embodiment, the combined system of FIG. 4C allows the conventional PRACH chain to detect the presence or absence of a preamble as well as the preamble index and RTT using the threshold approach implemented in the system of FIG. 3B, while ML Engine 301 also detects the presence or absence of a preamble as well as the preamble index. The two results are compared for affirmation by Reporter 401. In this approach, in case of a conflict, the ML based approach may take precedence.

The ML Engine training is key to the success of ML Engine for preamble detection. The training can be either online or offline. In case of an offline training, the input dataset is stored on a computer outside the base station, and training happens on that computer. The online ML training engine could be either a special hardware implementation such as Application Specific Integrated Circuit (ASIC), and purely software implementation both of which can take place on a component of the base station such as the Central Unit (CU). The hardware implementations of ML Engine and the ML Engine Trainer may be resident on the base station.

Figure 5:
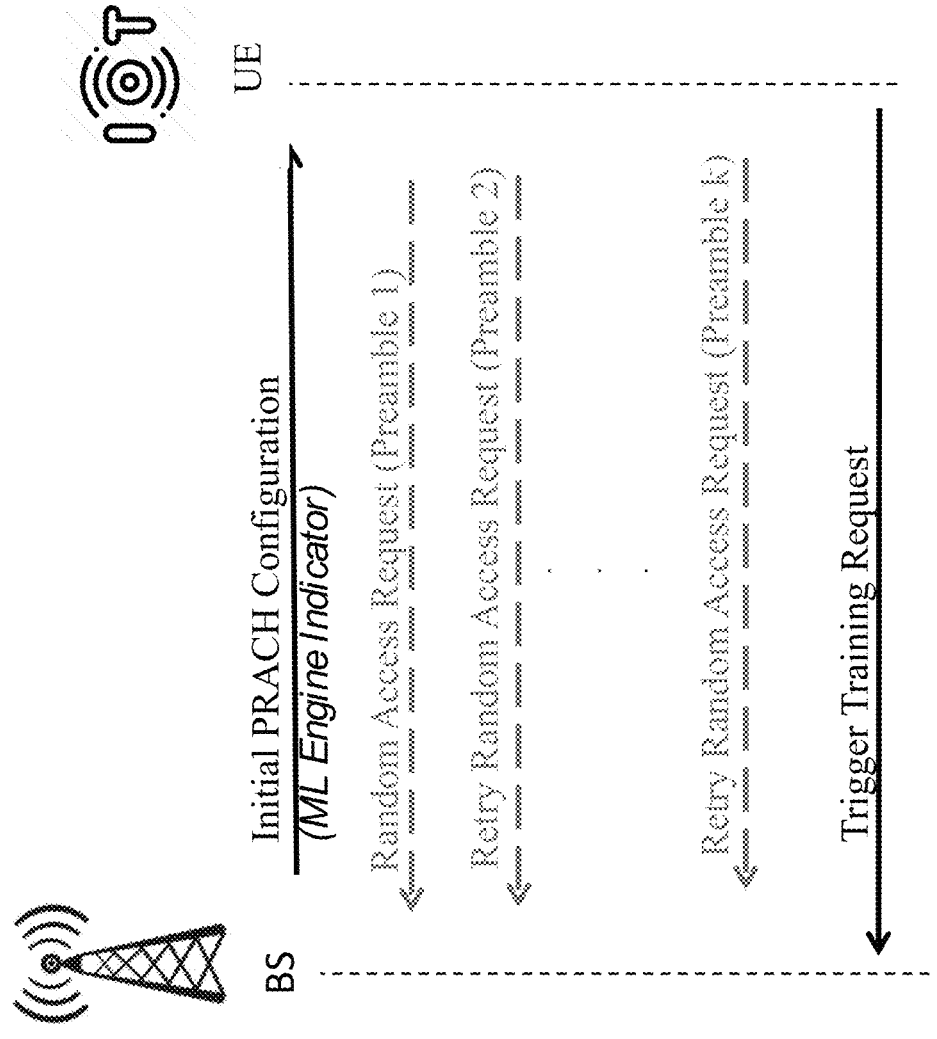
FIG. 5 shows the messaging between the UE and BS before training according to invention

FIG. 5 depicts an exemplary messaging sequence between a UE and the BS to detect PRACH performance deterioration as perceived by the UEs according to the first embodiment of this invention that is followed by a training cycle. During initial PRACH configuration, the BS sends a few additional configuration parameters that is not currently specified in LTE and 5G standards such as an ML Engine indicator, as an indicator that the BS receiver is using a trainable ML Engine for preamble detection, as well as an optional training CFRA preamble. If the ML Engine Indicator is set to 1, for example, the UE starts paying attention to unsuccessful RA attempts. If a time-out occurs after, say, K successive RA trials, the UE sends an indication of failure by sending a Triggering Training Request message on the downlink control channel to the BS. When the BS receives this message, the higher layers record the sender's UE ID, a time-stamp, and the event. When the number of such events over a configurable time window exceeds a threshold, for example, the higher layers trigger ML engine training cycle. Depending on the different logic that BS uses, many trivial alternatives arise for decision making for triggering a cycle of training by including other data such as cell profile changes, Number of UE changes, SNR and interference measurements becoming a factor for triggering.

The Triggering Training Request Message is a Medium Access Layer (MAC) or RRC message that is sent by the UE addressed to the MAC address of the BS. It can be sent on UL PUSCH or PUCCH just like other control messages between the BS and UE.

Figure 6:
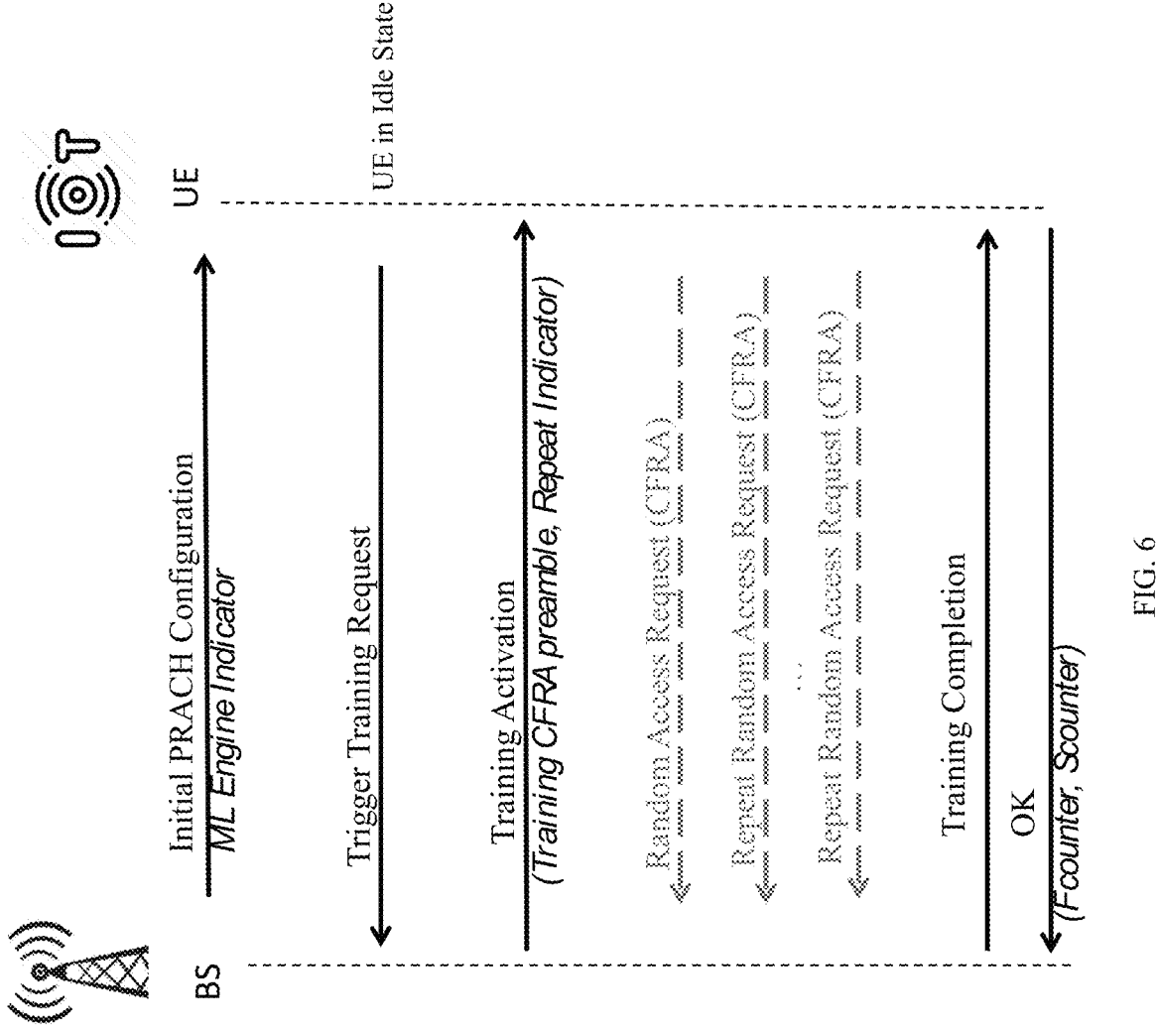
FIG. 6 shows the messaging between the UE and BS for training activation according to invention.

FIG. 6 depicts another exemplary messaging sequence between a UE and the BS according to the second embodiment of this invention when the BS decides to trigger an ML training cycle and gathers controlled data from the UE using a CFRA preamble. Note that if the RAR is not returned by the receiver in CFRA, it is a direct indication of PRACH congestion since there is no collision to speak of in CFRA. The BS may decide to set aside a group of CFRA preambles for training purposes only. The controlled data gathering requires an additional message sequence between UE and BS, and a small additional load on UE RA processing. The BS sends a Training Activation message to a trainer-UE. The trainer-UE is a UE in state that has or hasn't previously sent a Triggering Training Request message.

The Training Activation Message is a Medium Access Control (MAC) or Radio Resource Control (RRC) layer message that is sent by the BS addressed to the MAC address of the UE. It can be sent on UL PUSCH or PUCCH like other control messages between the BS and UE.

The BS either selects one UE or a small group of UEs as trainer-UEs. The selection is performed such that each selected trainer-UE is normally configured with a different CFRA preamble. If the UE is not originally configured with a training preamble or if the BS wants to override the previously sent training preamble, the BS may send the training preamble configuration to use for the controlled data gathering along with the corresponding PRACH radio resource in the Training Activation message. By optionally assigning the same CFRA to more than one trainer-UE, the BS may attempt to simulate the preamble collision scenario to collect corresponding training data.

Each Training UE may send the CFRA once or optionally multiple times using the specified PRACH radio resource. The Training Activation may also contain an indicator whether the UE must send the CFRA preamble (a) once or (b) repeat M number of times over a time interval and stop training, or (c) repeat multiple times over a time interval until a training completion message is received from the BS and then stop training. After sending the training CFRA preambles the requested number of times, the UE automatically fallbacks to its normal operations.

The training completion message may optionally be required depending on whether the repeat times for the CFRA preamble is known by the UE. The training completion message may optionally require a response from the UE that contains the number of succeeded and failed CRFA RA attempts.

During the training cycle, if the BS identifies the CFRA preamble from the trainer-UE correctly, it labels the received preamble signal as 'correctly detected'. If the BS identifies a wrong preamble instead or can't detect the preamble, it labels the received preamble as 'undetected'. During the training cycle, the BS listens to a reserved PRACH resource that has no preamble assigned. If it identifies a preamble from a noise signal on this resource, it labels the received signal as 'false alarm'.

The sequence of messaging shown in FIGS. 5 and 6 are only for the purpose of explaining the ML training triggering process according to invention. Trivial modifications, additions, or changes to the messages (name, format, content, and sequence) are possible within the framework of UEs directly informing the BS about poor PRACH performance and then partaking in generating a controlled preamble dataset. Different such sequence scenarios are described in what follows.

Figure 7:
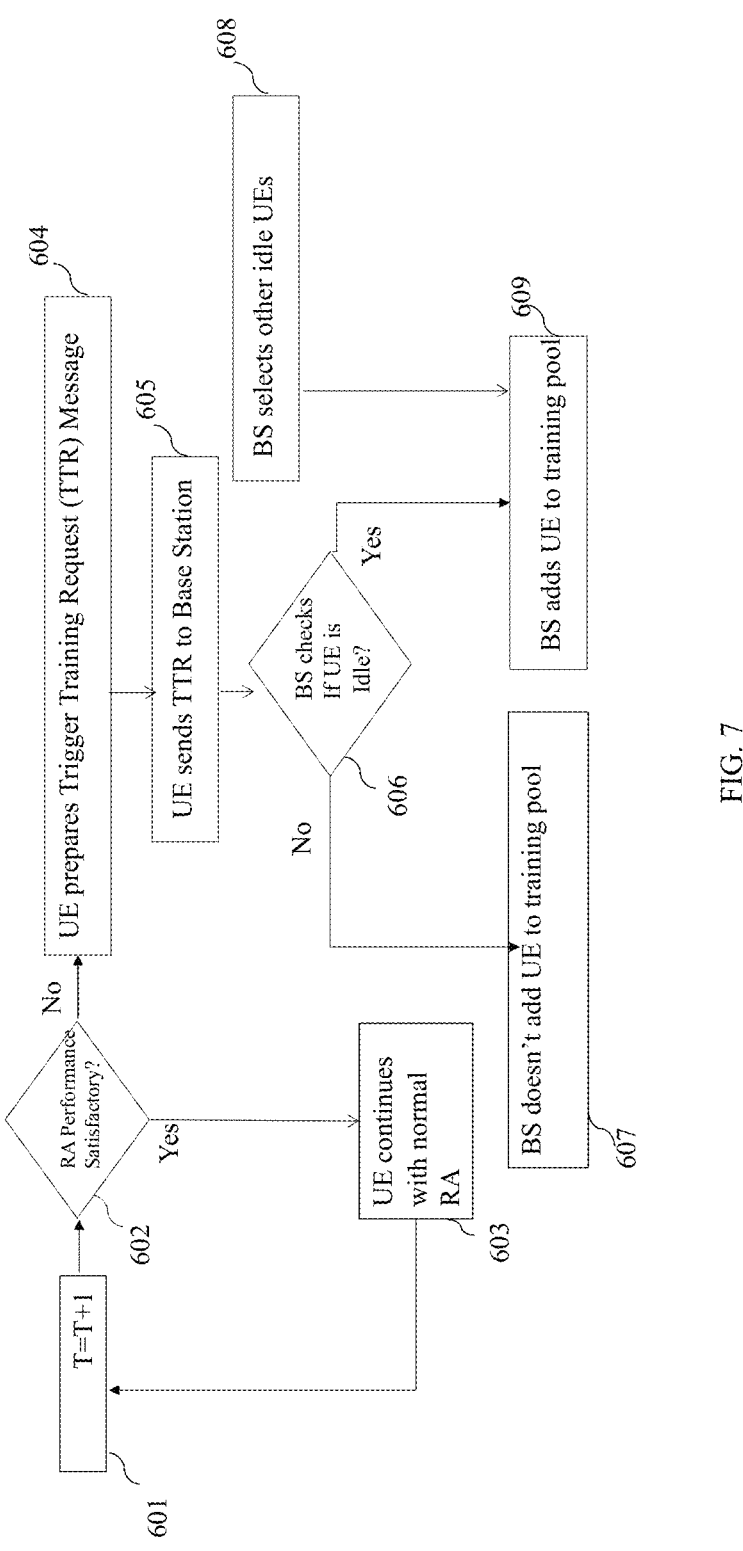
FIG. 7 shows a key method of the invention.

FIG. 7 describes the flow chart of the training pool creation. In step 602, each UE checks to determine if its random access (RA) performance is satisfactory. If yes, the process returns to step 601 at which the cycle is incremented. Otherwise, at step 604, the UE's transmitter prepares Triggering Training Request (TTR) message in step 604 and sends it to the BS in step 605 over a control channel. The BS receiving this message is most likely receiving the same message from other UEs due to PRACH congestion. If the UE sending TTR is capable of providing random access data (e.g, it is not busy with other tasks, it does not have downlink data, it has sufficient battery or power and so on) for the network according to checkbox 606, the BS adds it into the training pool in step 609. Otherwise, the BS selects other UEs that are capable of doing so according to step 608. This process enables the BS to form a pool of UEs that will be used to directly collect controlled random access data for ML engine training.

Figure 8A:
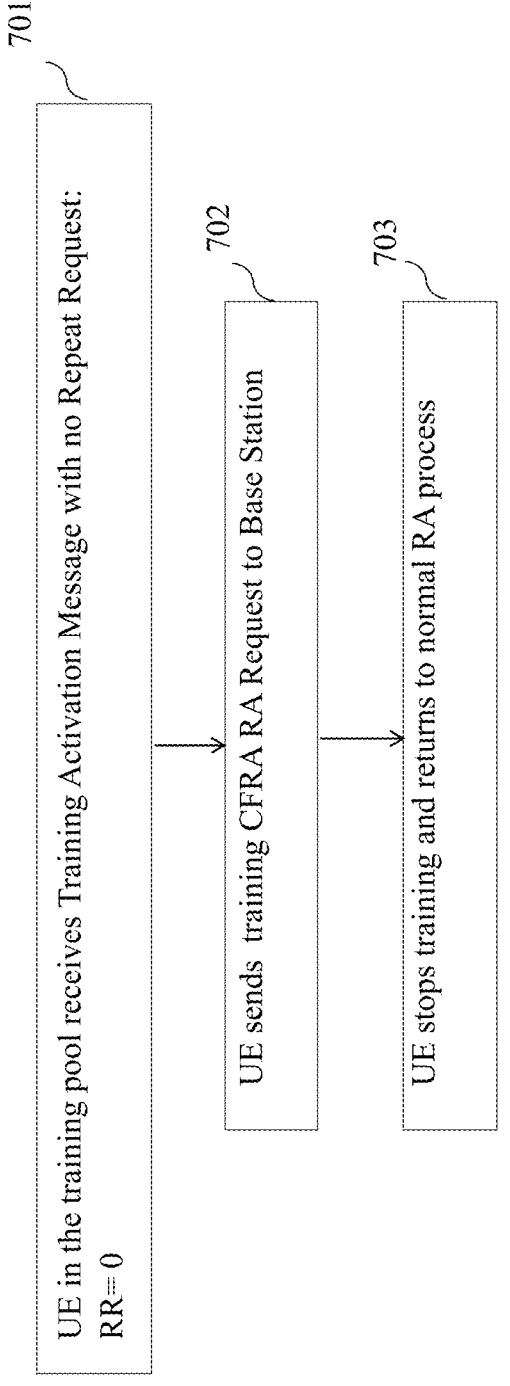
FIGS. 8A, 8B, 8C, 8D illustrate different variations of the method of invention.

FIG. 8A describes the first method of the UE performing training random access procedure. In step 701, the UE in the training pool receives Training Activation message from the BS without a repeat-request. This message contains the CFRA configuration. Optionally, the CFRA configuration may be provided during normal UE's RA configuration in which case Training Activation message is just a trigger to send the training CFRA at step 702. At the next step, the UE returns to normal operations in step 703. After sending the Training Activation message, the BS listens for the CFRA preamble signals at the PRACH resource specified by the CFRA configuration. If it detects the preamble, it labels the data as 'correctly detected'. Otherwise, it labels it as 'not detected'.

Figure 8B:
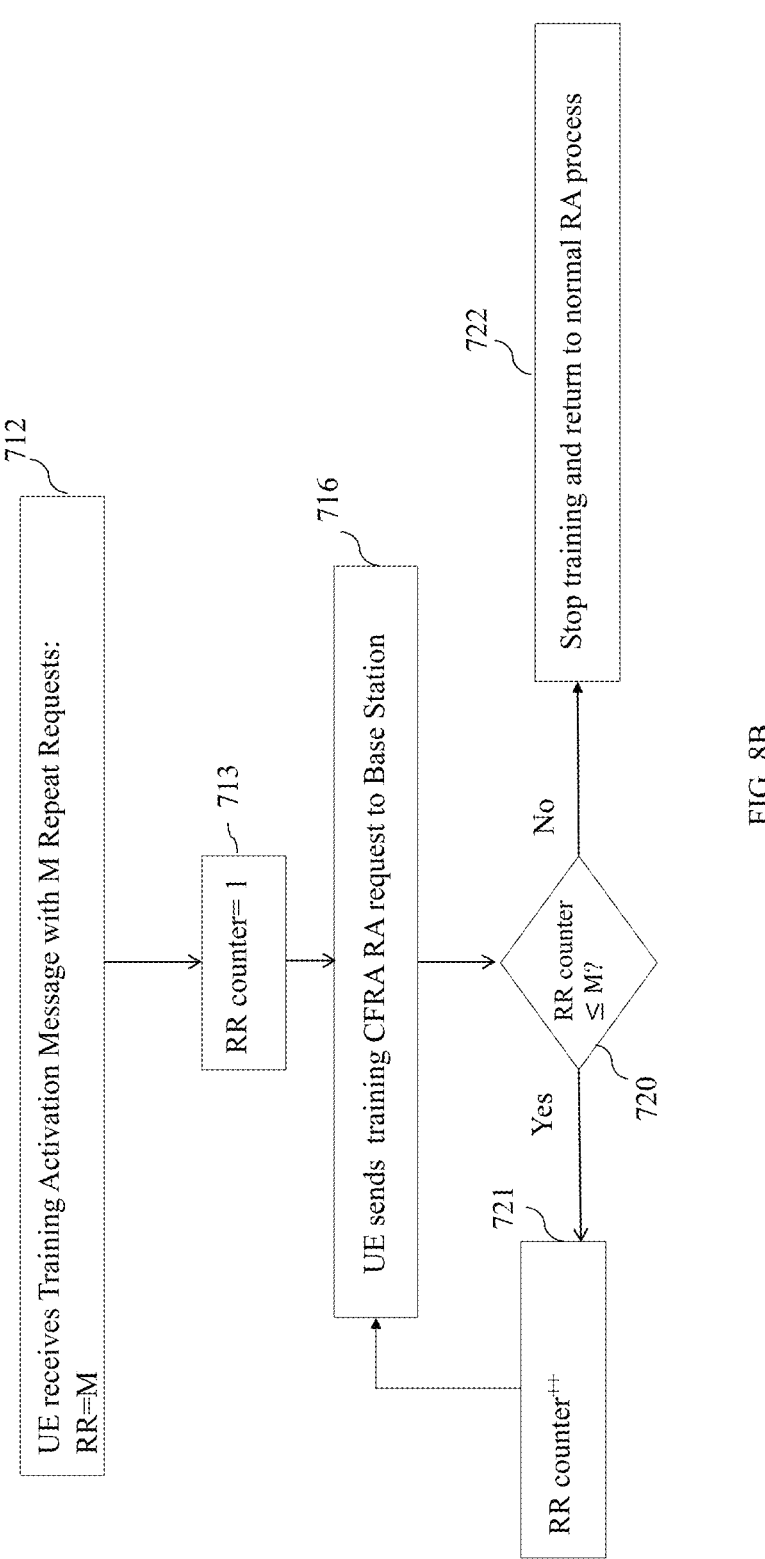

FIG. 8B describes the second method of the UE performing training random access procedure. In step 712, the UE in the training pool receives Training Activation message from the BS with a repeat-request of M (meaning the UE must successively send the CFRA preamble to the BS M times, each time after either receiving the RAR or after time-out). Training Activation message contains the CFRA configuration. Optionally, the CFRA configuration may be provided during regular RA configuration in which case Training Activation message is just a trigger to send the training CFRA at step 702. At the next step, the Repeat Request (RR) counter is set to 1 in step 713. The UE sends the CFRA preamble to BS in step 716. At step 720, the UE checks to determine if RR is less than M. If so, the RR counter is incremented in step 721, and the process repeats. Otherwise, at step 722 the UE stops sending the CFRA preamble and returns to normal operations. After sending the Training Activation message, the BS listens for the CFRA preamble signals at the PRACH resource specified by the CFRA configuration. Each received preamble signal received is labeled by the BS as 'correctly detected' or 'not detected'.

Figure 8C:
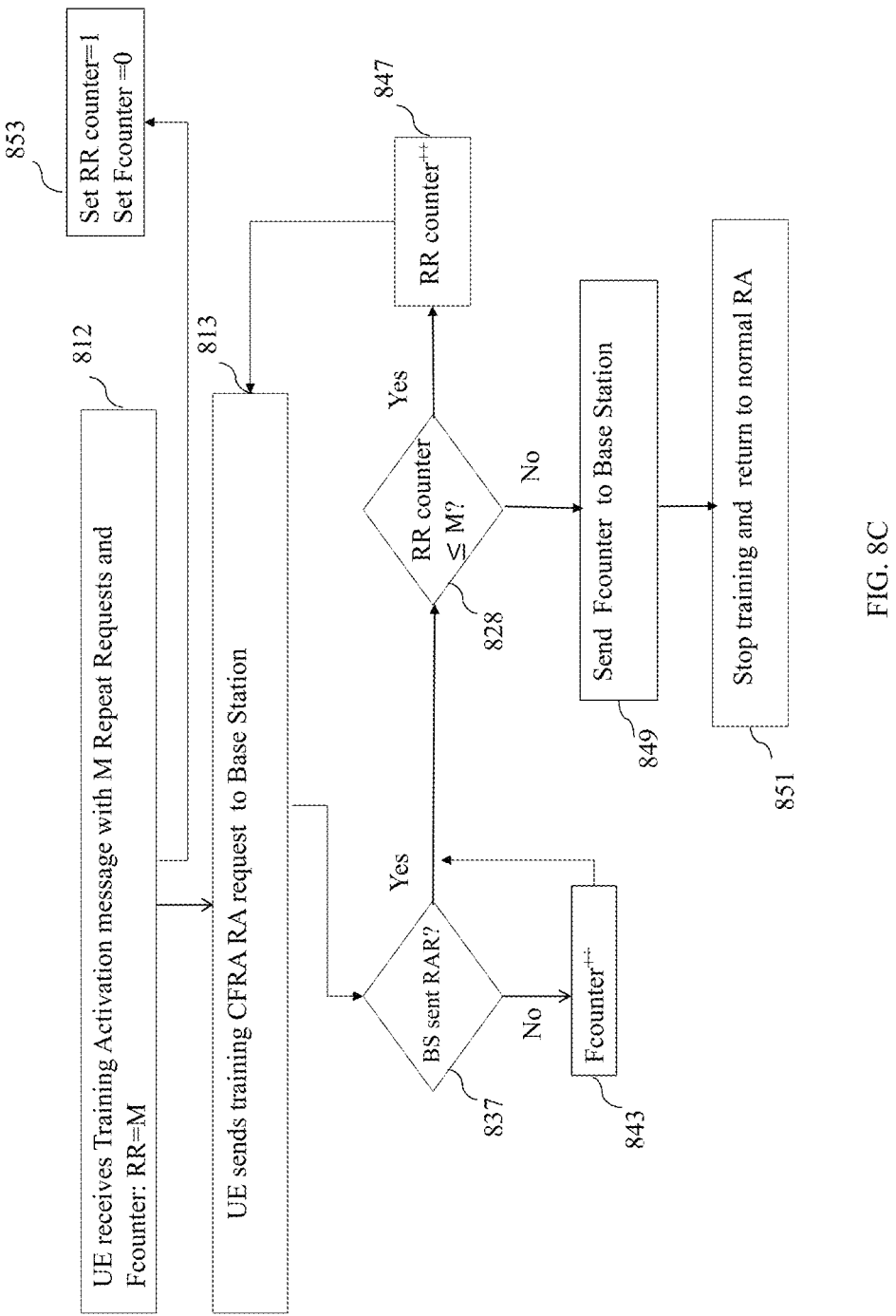

FIG. 8C describes the third method of the UE performing training random access procedure. In step 812, the UE in the training pool receives Training Activation message from the BS with RRcounter=M and an optional failed RA counter (Fcounter). Meaning, the UE must successively send the CFRA preamble to the BS M times, each time after either receiving the RAR or after time-out, and must increment Fcounter each time the RAR is not received from the BS. At step 853, RRcounter is set to 1 and Fcounter is set to 0. In step 813, the UE sends the CFRA preamble to BS upon which it checks to determine if the BS sent a RAR or not in step 837. If the RAR is not received, it increments the Fcounter by one. Otherwise, it checks to determine if RR is less than M in step 828. If so, RRcounter is incremented by one in step 847 and the process repeats. Otherwise, the UE sends the Fcounter to the BS in step 849. In step 851, it stops training and return to normal RA operations.

Figure 8D:
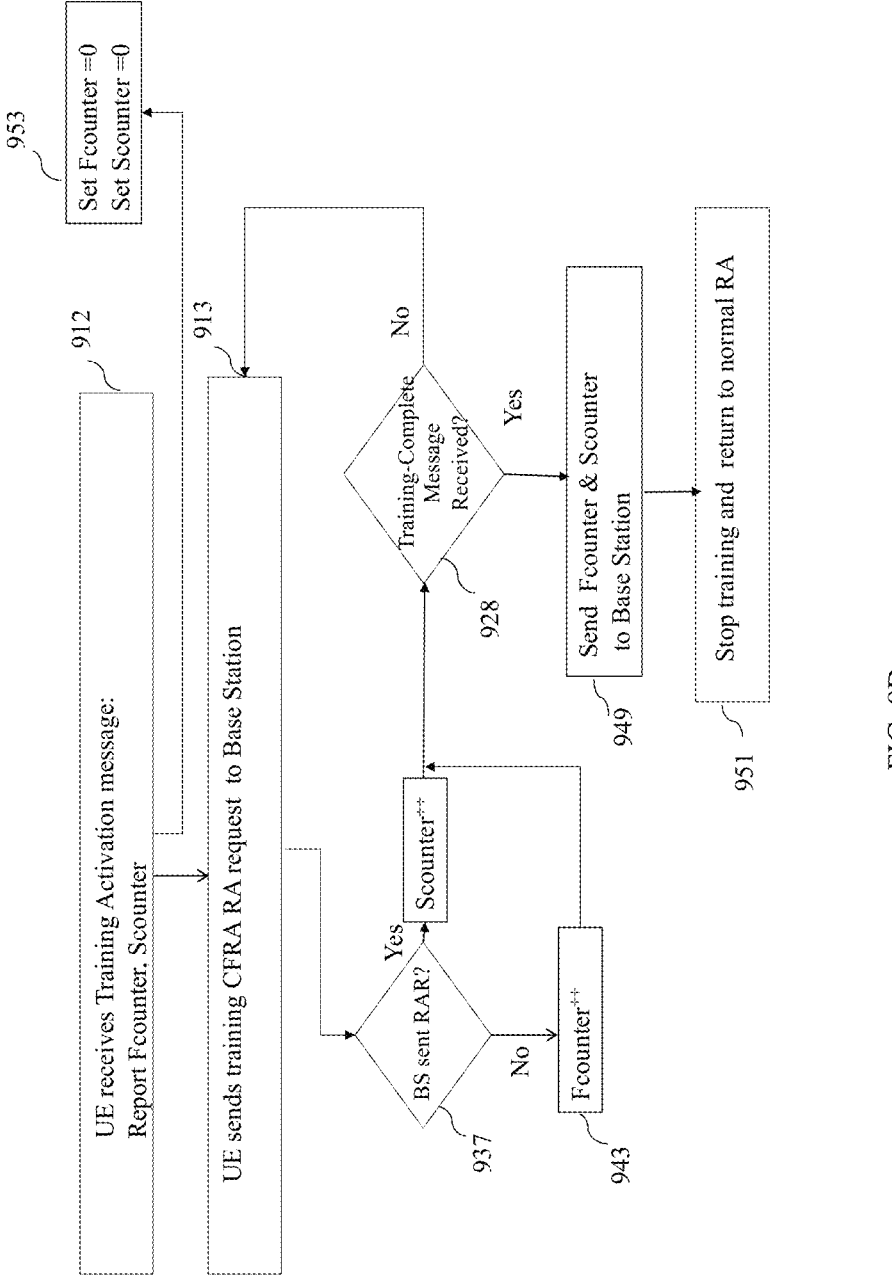

FIG. 8D describes the fourth method of the UE performing training random access procedure. In this method, the UE does not explicitly receive a repeat-request. Instead, the UE receives a Training Complete message from the BS until which it must continue to send the CFRA preamble repeatedly. The UE is incrementing Fcounter for failed attempts and Scounter for successful attempts. Optionally, the UE reports both Fcounter and Scounter by returning an OK message in response to the Training Complete message.

Many trivial modifications of the enumerated embodiments can be conceived and assumed covered by this invention. Depending on the capabilities of each trainer-UE in the cell, the BS may decide to implement training strategies with different complexity levels on a per UE basis. While some simple UEs may send CFRA once, other type of UEs may send the CFRA a plurality of time, and while some other types of UEs may send the CFRA a plurality of time and report the number of times the training CFRA RAR has failed. Optionally, the BS may decide to implement the same training strategy regardless of UE capabilities.

Figure 9:
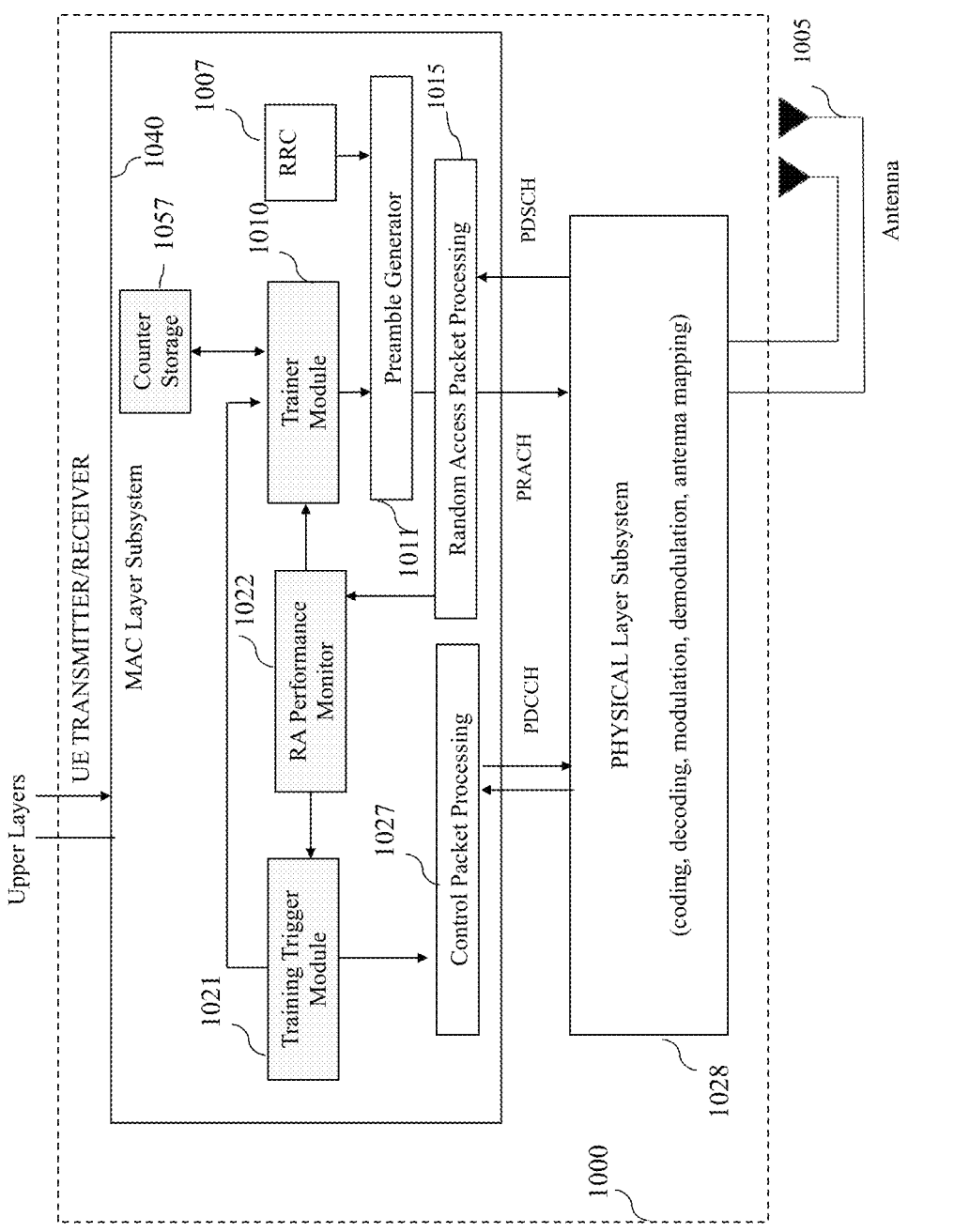
FIG. 9 illustrates a high-level block diagram of the User Equipment's receiver and transmitter according to invention.

The system diagram of the UE supporting the methods of this invention is illustrated in FIG. 9. The radio signals are received and transmitted through antenna array 1005. The physical layer subsystem of the transmitter and receiver that performs functions such as coding, decoding, modulation, demodulation, and antenna mapping is shown as 1028. There is no impact of this invention on physical layer operations. The physical layer well known in prior art supports both control and data messaging in the uplink and downlink direction. Control Packet Processing 1027 prepares control packets at the MAC layer and sends to physical layer processing 1028. Random Access Packet Processing 1015 is separately illustrated as it is relevant to this invention, although it may be implemented integrated with 1027. RA Performance Monitor 1022 detects failed and succeeded normal or training RA attempts. If it detects failed RA attempts, it sends a message to Training Trigger Module 1021 which is responsible for informing the BS by generating and sending the Trigger Training Request control packet to the BS according to aspects of this invention shown in FIG. 5. The Trigger Training Request is a MAC layer packet that is first sent to control packet processing 1027, then to physical layer 1028 and finally to antenna 1005 to be transmitted as a radio signal in the UL direction to the BS. Module 1021 also receives in the DL direction a message for Training Activation from the BS, if the UE is selected as a trainer-UE, in which case Module 1021 communicates with Trainer Module 1010 to initiate the training process with the training CFRA configuration. If the Training Activation message has specific directions such as a repeat-request, such information is also communicated by Module 1021 to Trainer Module 1010. Any counters optionally used during the training cycle is stored in Counter Storage 1057. Trainer Module 1010 uses the Preamble Generator 1011 that is used for normal operations. Module 1015 performs normal RA packet processing. From UEs perspective, Modules 1011 and 1015 handles both training and normal RA operations seamlessly. For example, RRC Module 1007 that performs a normal operation also uses Modules 1011 and 1015. In one implementation, RRC Module 1007 and Trainer Module 1010 may be integrated as one subsystem.

One or more of the components illustrated in these Figures can be implemented in specialized circuitry configured to perform the noted functions or one or more of the components can be implemented by one or more processors executing instructions to perform the noted functions. Other embodiments are used without departing from the scope of the present disclosure.

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RANI, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations such as FFT/IFFT and modulation/demodulation operations can be performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

What is claimed is:

1. A method of a user equipment that is deployed within a radio access network (RAN) cell of a base station that uses Machine Learning engine for a random access procedure, the method having the steps of:
   a: receiving from the base station a training activation control message to initiate training data collection from the user equipment, the training activation control message comprising a contention-free random access configuration for training purposes only;
   b: sending by the user equipment the contention-free random access (CFRA) preamble over configured PRACH to the base station; and
   c: resuming normal random access procedures by the user equipment after step b.

2. The method of claim 1, wherein the user equipment is a user equipment that reported poor random access performance using a trigger training message.

3. The method of claim 1, wherein the user equipment is a user equipment is not among the user equipment that reported poor random access performance using a trigger training message.

4. The method of claim 1, wherein a CFRA configuration sent to each user equipment is different.

5. The method of claim 1, wherein a same CFRA configuration is sent to a group of the user equipment.

6. A method of a user equipment that is deployed within a radio access network (RAN) cell of a base station that uses Machine Learning engine for a random access procedure, the method having the steps of:
   a: receiving from the base station a training activation control message to initiate training data collection from the user equipment, the training activation control message comprising a contention-free random access configuration for training only with an indication to repeat sending a contention-free random access preamble until a training complete control message is received by the user equipment from the base station;
   b: sending by the user equipment the CFRA preamble over configured PRACH to the base station a plurality of times until receiving a training completed control message from the base station; and
   c: resuming normal random access procedures by the user equipment after step b.

7. The method of claim 6, further comprising the step of reporting to base station the number of times the CFRA procedure is attempted and the number of times the CFRA procedure has failed by not receiving the random access response to the sent preamble.

8. The method of claim 6, wherein the user equipment is a user equipment that reported poor random access performance using a trigger training message.

9. The method of claim 6, wherein the user equipment is a user equipment is not among the user equipment that reported poor random access performance using a trigger training message.

10. The method of claim 6, wherein a CFRA configuration sent to each user equipment is different.

11. The method of claim 6, wherein a same CFRA configuration is sent to a group of the user equipment.

12. A method of a user equipment that is deployed within a radio access network (RAN) cell of a base station that uses Machine Learning engine for a random access procedure, the method having the steps of:
   a: receiving from the base station a training activation control message to initiate training data collection from the user equipment, the training activation control message comprising a CFRA configuration for training only with an indication of the number of repeats the user equipment must send a CFRA preamble;
   b: sending repeated by the user equipment the contention-free random access preamble over configured PRACH to the base station the number of repeats; and
   c: resuming normal random access procedures by the user equipment after step b.

13. The method of claim 12, further comprising the step of reporting to base station the number of times the CFRA procedure is attempted and the number of times the CFRA procedure has failed by not receiving the random access response to the sent preamble.

14. The method of claim 12, wherein the user equipment is a user equipment that reported poor random access performance using a trigger training message.

15. The method of claim 12, wherein the user equipment is a user equipment is not among the user equipment that reported poor random access performance using a trigger training message.

16. The method of claim 12, wherein the CFRA configuration sent to each user equipment is different.

17. The method of claim 12, wherein a same CFRA configuration is sent to a group of the user equipment.

* * * * *